United States Patent [19]

Ross

[11] Patent Number: 5,871,621
[45] Date of Patent: Feb. 16, 1999

[54] METHOD OF FABRICATING A TEXTURED MAGNETIC STORAGE DISK

[75] Inventor: Caroline A. Ross, Mountain View, Calif.

[73] Assignee: Komag, Incorporated, Milpitas, Calif.

[21] Appl. No.: 313,704

[22] Filed: Sep. 27, 1994

[51] Int. Cl.[6] .............................. C23C 14/34; B05D 5/12
[52] U.S. Cl. ................................. 204/192.2; 204/192.16; 427/129; 427/131; 427/132
[58] Field of Search .................. 204/192.15, 192.16, 204/192.2; 427/129, 131, 132

[56] References Cited

U.S. PATENT DOCUMENTS

| | | | |
|---|---|---|---|
| 4,743,491 | 5/1988 | Asada et al. | 427/131 |
| 4,950,548 | 8/1990 | Furusawa et al. | 204/192.2 |
| 5,132,173 | 7/1992 | Hashimoto et al. | 204/192.2 |

FOREIGN PATENT DOCUMENTS

| | | | |
|---|---|---|---|
| 0 399 747 | 4/1990 | European Pat. Off. . | |
| 62-256215 | 7/1987 | Japan . | |
| 2 202 866 | 3/1987 | United Kingdom | 204/192.2 |

OTHER PUBLICATIONS

Translation of 62–256215 Kono et al., Jul. 1987.

*Primary Examiner*—R. Bruce Breneman
*Assistant Examiner*—Rodney G. McDonald
*Attorney, Agent, or Firm*—Skjerven, Morrill, MacPherson, Franklin & Friel

[57] ABSTRACT

A magnetic disk storage medium (10) includes a smooth non-magnetic substrate (11) having surface roughened by sputter-depositing a continuous nonmagnetic rough thin film ("texture film") (14) over the substrate. The sputter conditions and composition of the texture film (14) are chosen to give a desired roughness and areal density of asperities. A sputtered adhesion layer (12) and/or a sputtered capping layer (15) are included to control the growth of the texture film and to improve its mechanical properties, respectively. A non-magnetic underlayer, a magnetic layer and a protective layer are then sputtered sequentially over the roughened substrate.

39 Claims, 15 Drawing Sheets

METHOD OF FABRICATING A TEXTURED MAGNETIC STORAGE DISK

BACKGROUND OF THE INVENTION

This invention relates to a thin film magnetic disk recording medium. More particularly the invention relates to texturing a recording medium.

Generally, magnetic thin film disks comprise a substrate on which a non-magnetic underlayer, a magnetic layer and a protective overcoat are deposited by vacuum deposition, followed by application of a thin layer of lubricant. An example of such a disk is described in U.S. Pat. No. 5,180,640, incorporated herein by reference. It is known to use, as a substrate, ceramic material, glass, or an aluminum alloy coated with electrochemically deposited nickel-phosphorus ("NiP").

During use, the disk is rotated rapidly by a motor. In order to read and write data on the disk, a recording head "flies" very close to the rotating disk. The recording head typically rests in contact with the disk when the disk is not rotating. To prevent severe adhesion (stiction) between the head and disk, the surface of the disk is intentionally roughened or "textured". (The problem of stiction is described in U.S. Pat. No. 5,053,250, column 1.) For magnetic disks comprising metal substrates coated with NiP, texturing is usually done by abrading the electrochemically deposited NiP surface with fine particles to form circumferential ridges. Other texturing methods are also known in the art. For nonmetallic substrates, such as glass, texturing may be done by chemically etching the substrate to leave bumps, or covering the surface with fine particles. U.S. Pat. No. 4,833,001 (incorporated by reference) discloses a typical etching process.

To maximize the recording density, the recording head flies as close to the disk surface as possible. Hence the roughness of the disk surface is minimized, consistent with maintaining sufficiently low stiction.

The abrasive texturing method cannot be used for typical non-metallic disk substrates because of their hardness, so other methods such as chemical or plasma etching or coating the substrate with a fine dispersion of particles, have been adopted. However, these processes, like abrasive texturing, are expensive in production as they require a number of process steps to be applied to each substrate. Additionally, in the case of texturing NiP, any irregularities that protrude sufficiently above the normal textured surface can damage the head while the head is flying and can cause the head to crash. Also, each texturing method is specific to a particular substrate material so that changing the composition or type of the substrate material requires the development of a new texturing method.

European Patent Application No. 0 399 747 A, published Nov. 28, 1990, advocates texturing a substrate by forming a discontinuous metal layer over the substrate surface. This layer forms a discontinuous multiple island structure over the plane of the substrate surface. The '747 method depends critically on the wetting between the islands and the substrate which restricts the choice of materials and makes the substrate cleanliness and absence of surface contaminants critical. The islands are coated with an "oxygen trap" layer of Ti, and then a thick Cr underlayer/magnetic layer/overcoat stack. The Ti layer contacts the substrate and bonds the islands to the substrate since the islands themselves poorly adhere to the substrate. Of importance, the '747 patent application requires formation of an island structure rather than a continuous layer, or deterioration occurs at the interface between the metal used to form the islands and underlying substrate. See, e.g., the "comparative example" at '747 column 8.

Another island-forming layer is discussed in U.S. Pat. No. 5,053,250. Drops of Ga or other transient liquid metals (e.g. In, Sn, Bi, Pb or other metals) are coated directly on and react with the magnetic film. The disk texture results from the reacted layer. Hence the Ga layer determines both the texture and magnetic characteristics, which makes it difficult to control both independently.

In U.S. Pat. No. 5,082,709 particle-like projections are formed in circumferential bands on a smooth or initially circumferentially textured substrate, and thereafter a magnetic layer is applied to the substrate. The projections are arranged in bands to enhance magnetic anisotropy. The '709 patent states that the projections are fine particles with heights preferably of 10 to 50 nm and an areal density of 10 to 1000 $\mu m^{-2}$, and cover between 10 and 80% of the disk. According to the '709 patent, if they cover too much of the disk stiction is too high. The '709 patent mentions forming the projections by several techniques, including sputtering, ion beam deposition or by putting particles in a binder and brushing the particles and binder onto the substrate. For particles in a binder, the projections are arranged in bands by circumferential brushing. For projections formed by the other above-mentioned techniques, it is not entirely clear how the projections are formed into bands, or how coverage of 10 to 80% of the disk is obtained.

SUMMARY OF THE INVENTION

The present invention is directed to reducing stiction by introducing surface roughness to an initially smooth substrate by depositing one or more sputtered films which grow with a controlled roughness determined by the sputter conditions and materials selected. The roughness is introduced by growing a continuous, low melting point material film (a "texture film"). This texture film develops a surface roughness as its grains grow. I have found that the average roughness Ra of a range of films 5 to 500 nm thick increases (usually linearly) with film thickness. (In this patent, Ra values are as measured by an atomic force microscope.)

Moreover, the rate of change of roughness with film thickness correlates approximately inversely with the melting point (more properly, the self-diffusion coefficient) of the material selected. For example, Zn films roughen more quickly with film thickness than Al films, and Al films roughen more quickly than Cu films. The roughness also depends on the sputter mode (r.f. sputtered films roughen more easily than d.c. sputtered films) and on the sputtering conditions (e.g., roughening is enhanced by higher pressures and higher substrate temperatures). The texture film is continuous, i.e. it covers the substrate without leaving pores or gaps. The density of asperities, i.e. the roughness peaks, also depends on the choice of materials and deposition parameters.

It is therefore advantageous to use a low-melting point material (e.g. a metal such as Al, Zn, Sn, Pb, their alloys or other low melting point metals or alloys), r.f. sputtering, an elevated substrate temperature (but not high enough to warp or damage the substrate) and a high sputter pressure (e.g. 20 to 30 MTorr). This gives a texture film with the requisite roughness (Ra =about 2 to about 5 nm) for a relatively thin sputtered film (e.g. 20 to 60 nm thick). A thin film is desirable in order to reduce process time and material usage. Further, low melting point materials used to form the texture film are often mechanically soft and if the film is thin there is less possibility of damaging or deforming it. However, a more refractory sputtered texture film (such as Cu, Cu-Zn, Ag, Au, or other metals, alloys or ceramics) may be advantageous since the costs of a thicker film (to obtain the same Ra) is offset by the improved film hardness.

In one embodiment of my invention an adhesion layer may be sputtered between the texture film and the underlying substrate to enhance adhesion. Materials used in this adhesion layer typically include Cr, Ta, Ti, W, Nb, V, Zr, Mo or their alloys. This optional adhesion layer need not contribute to the surface roughness.

Another layer (a capping layer) may be sputtered over the texture film to protect the texture film from mechanical damage caused by impact of the recording head against the magnetic disk during use. Suitable materials include hard layers such as Cr, Ta, Ti, W, Mo, Nb, Zr, V, alloys thereof, or hard ceramic materials such as $SiO_2$, $Al_2O_3$, $ZrB_2$ or TiC. The capping layer does not significantly affect surface roughness but it does provide a hard overcoat to protect the texture film from damage.

The magnetic stack (an underlayer, magnetic layer and overcoat layer) is then sputtered on top of the capping layer (or if there is no capping layer, on top of the texture film).

The texture method of the invention allows formation of a texture of controlled roughness on an initially smooth substrate with the surface texture characteristics controlled via the sputter deposition parameters and choice of materials. This method is a more economical method of making a controlled surface texture since the rough sputtered texture film and the optional adhesion and capping layers can be deposited in the same pass-by sputter system as the other sputtered layers on the disk. This eliminates the need for separate texturing processes.

The texture film may also be deposited in a separate sputter system, but is still economical due to the high throughput of the sputter system.

Texturing can be applied to a smooth substrate made of a range of materials, including metallic substrates, glass, ceramics, sintered carbon, canasite or glass-ceramics.

BRIEF DESCRIPTION OF THE DRAWINGS

FIG. 23 and 27 illustrate the results of a CSS test for a conventional circumferentially textured magnetic disk.

DETAILED DESCRIPTION OF THE INVENTION

Figure 1:
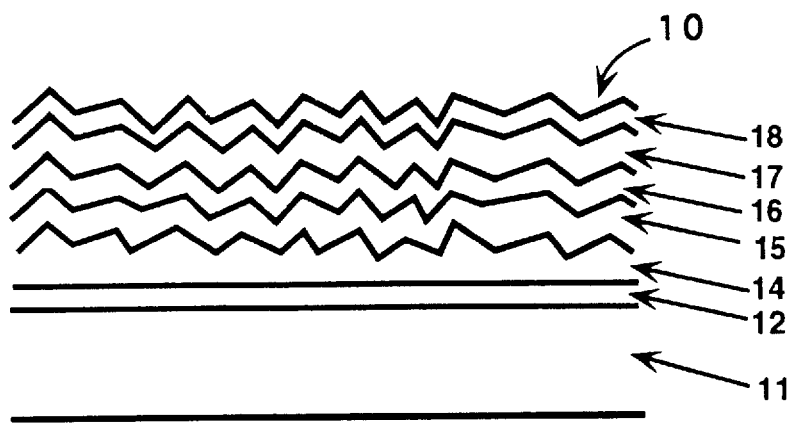
FIGS. 1 to 4 are enlarged schematic cross-section views of a magnetic disk textured in accordance with four embodiments of my invention.

Referring first to FIG. 1, a magnetic disk 10 includes a substrate 11 made of sodium borosilicate, sodalime or other glass, an aluminum alloy coated with NiP and then polished, other metals, ceramics or sintered carbon. Substrate 11 is typically smooth, and generally has a roughness Ra less than about 2 nm, and on average may be about 1 nm. The invention may be used with a very smooth substrate, e.g. having an Ra of 0.2 nm or less. Substrate 11 is coated with an adhesion layer 12 to promote improved adhesion with subsequently deposited layers. Adhesion layer 12 is preferably a coating of a refractory metal or a transition metal from one of the earlier columns of the periodic table, such as Cr, Ta, Ti, Mo, V, W, Nb, Sc, Y or Zr, or alloys thereof, applied by r.f. magnetron, r.f. diode, d.c. magnetron or d.c. sputtering. For the r.f. magnetron sputtering, sputtering may be at 20 mTorr of pressure in an argon atmosphere and a power density of 2 W/cm$^2$. For d.c. magnetron sputtering, pressure may be at 10 mTorr in argon and the power density may be 15 W/cm$^2$. However, the sputter conditions for the adhesion layer are not critical.

The subsequently deposited texture film 14 typically forms a stronger bond to a freshly sputtered adhesion layer (e.g. Cr) than it would to as received substrate 11 because there is a better chance of forming a strong chemical bond between layer 12 and film 14, e.g. a strong intermetallic bond for the case in which both layer 12 and film 14 are metals.

Figure 3:
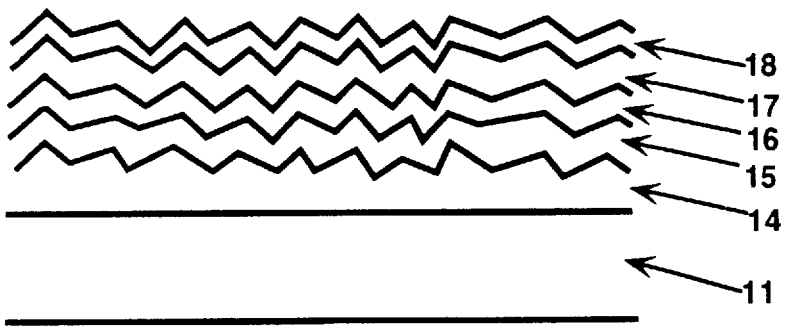
Figure 4:
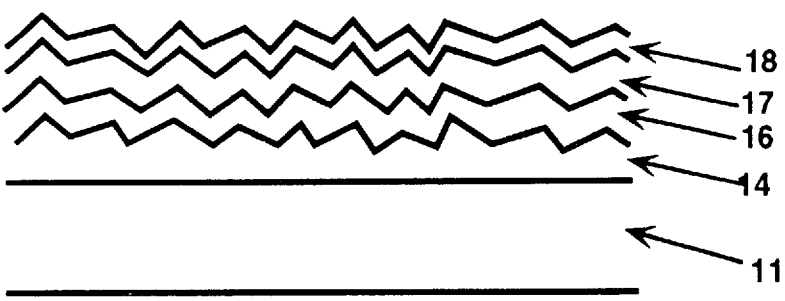

The thickness of adhesion layer 12 is not critical as long as layer 12 can improve the adhesion of subsequently formed layers to substrate 11. A 2 to 50 nm thickness may be used, but a 2 to 20 nm thickness is preferred since it is easier and more economical to form a thinner adhesion layer. While adhesion layer 12 may be useful, other embodiments of my invention (e.g. as shown in FIGS. 3 and 4) do not include layer 12.

A low melting metal (e.g. a melting point less than about 1000° C. and preferably less than 750° C.), such as Al, Zn, Pb, Sn, Bi, In, Li or Se, or alloys thereof, is then sputtered to form texture film 14 on adhesion layer 12 (or directly on the surface of substrate 11). During sputtering, substrate 11 and optional layer 12 are at a temperature between 20° and 200° C. A planar r.f. magnetron sputtering machine with an argon gas pressure of from about 10 to about 30 MTorr and a power density of. from about 1 to about 6 W/cm$^2$ is preferably utilized to sputter film 14. The sputtering machine may be a model PE 4400 machine available from Perkin Elmer Co. of Minnesota. However, in other embodiments of the invention, other sputtering systems, pressures, and power densities are used. The low melting point metal film 14 develops a rough microtexture on its top surface as it grows. Development of grains or crystals on the surface of the growing layer produces the surface texture. Film 14 is the primary means of microtexturing the substrate over the entire substrate surface, upon which a magnetic alloy layer is to be subsequently deposited. The peak density and height of the asperities or roughness Ra are controlled by the sputtering operating parameters. It has been found that an Ra from about 2 to 10 nm and a peak pitch of from about 0.1 to 1 $\mu$m gives satisfactory results. An Ra of 2 to 5 nm is preferred, depending on the head used with the disk. (European patent application 0 583 989 A2, incorporated herein by reference, discusses selecting head and disk roughness characteristics.) Typical peak densities are between about 1 to 100 per $\mu$m$^2$.

Figure 2:
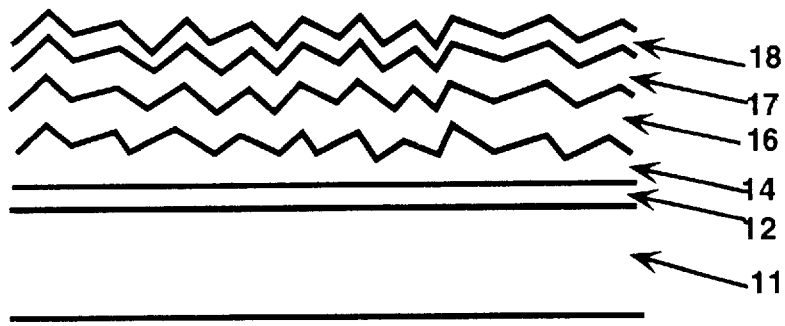

In order to increase the mechanical strength of film 14, a hard capping layer 15 of Cr, Ta, Ti or any suitably hard material may be sputtered by the same sputtering machine a similar pressure and power density. Capping layer 15 is typically 10 to 100 nm thick, and preferably 10 to 30 nm thick. The sputtering conditions by which layer 15 is formed are not critical. In general, capping layer 15 does not enhance disk roughness, but it can be made to enhance roughness, e.g. depending on thickness and sputtering conditions such as substrate temperature as described below. While capping layer 15 may be useful, other embodiments of my invention (e.g. as shown in FIGS. 2 and 4) do not include layer 15.

After capping layer 15 is formed, an underlayer 16 such as NiP, a magnetic layer 17 (typically a Co alloy) and an overcoat 18 (typically carbon) are then deposited by additional sputtering operations. Carbon layer 18 is then suitably lubricated in the conventional manner using a perfluoropolyether or other lubricant.

NiP sputtered underlayers in magnetic disks are described in U.S. Pat. No. 5,153,044, incorporated herein by reference. NiP layer 16 is typically formed because it has a beneficial effect on magnetic alloy 17. However, in other embodiments, layer 16 need not be formed. In addition, underlayers comprising materials other than NiP (particularly Cr and Cr alloys) can be used. Carbon as a protective overcoat on a magnetic disk is described in European patent application 0 440 259 A2, also incorporated herein by reference. Protective materials other than carbon (such as ZrO$_2$) can also be used as a protective overcoat on a magnetic disk in accordance with my invention. See, for example, U.S. Pat. Nos. 4,929,500 and 4,898,774, incorporated herein by reference.

As mentioned above, the higher the melting point for a material, the greater the thickness one must use to achieve a given roughness. It is desirable to be able to achieve a roughness Ra between 2 to 5 nm with a texture film thickness less than about 60 nm. Accordingly, it may be desirable to use a material having a melting point less than about 1000° C. to form film 14. However, it may also be desirable to use a material having a higher melting point to form film 14, e.g., because such materials tend to have greater mechanical strength. For example, a metal such as Cu, Ag, Au, an alloy such as Cu—Zn, or a ceramic material can be used in texture film 14. However, if a higher melting point material is used, that material must be a) sputtered to a greater thickness, and/or b) sputtered at a higher substrate temperature to achieve a desired roughness.

One can achieve a Ra between 2 and 5 nm with a film 60 nm or less with a material having a low melting point (e.g. Al, Zn, Sn, Pb or alloys thereof) when the substrate is at room temperature by r.f. sputtering at a high pressure (e.g. 20 to 30 mTorr). A thin rough texture film can also be achieved with a more refractory material (e.g. transition metals from the later columns of the periodic table such as Cu, Ag, Au or an alloy such as Cu—Zn) at an elevated substrate temperature (e.g. about 200° C.) and a greater thickness (e.g. 100 to 200 nm) using r.f. sputtering at a high pressure. One can use d.c. sputtering, but higher substrate temperatures or film thicknesses will be required to achieve a given roughness.

Figure 5:
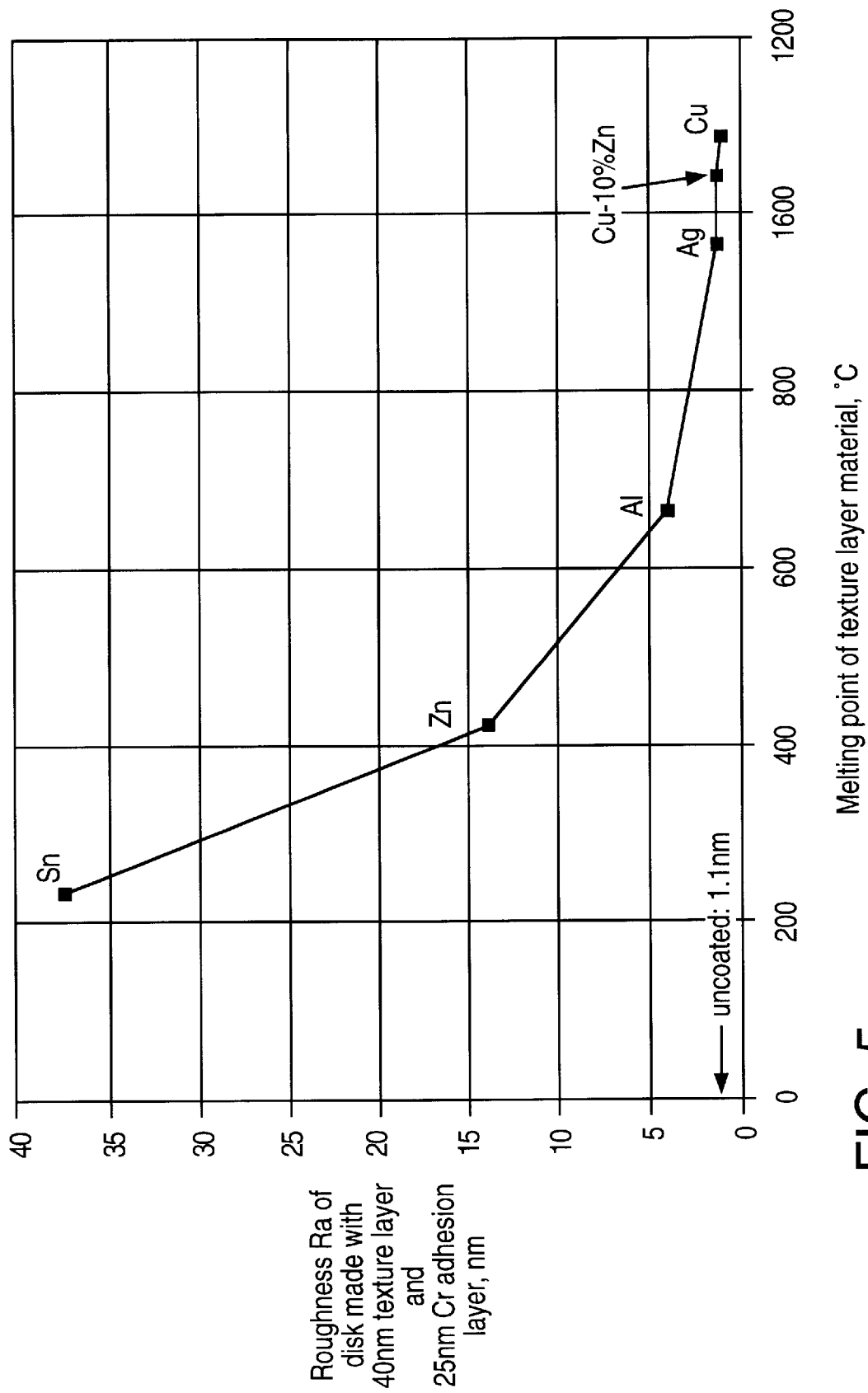
FIG. 5 illustrates the relationship between roughness of disks made with a 40 nm thick texture film and the melting point of the texture film material.
Figure 6:
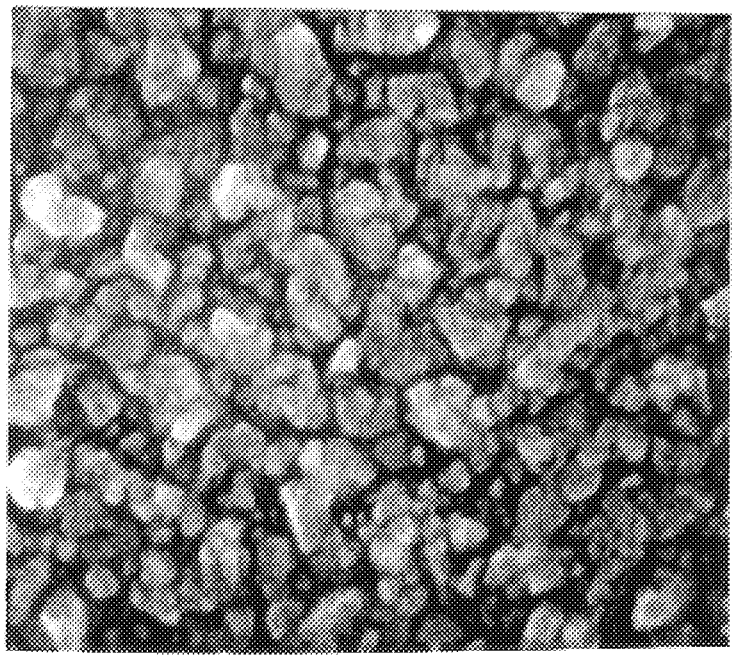
FIG. 6 is a scanning electron microscope ("SEMI") photograph showing the morphology of a 45 nm thick Al film sputtered onto a glass substrate.
Figure 7:
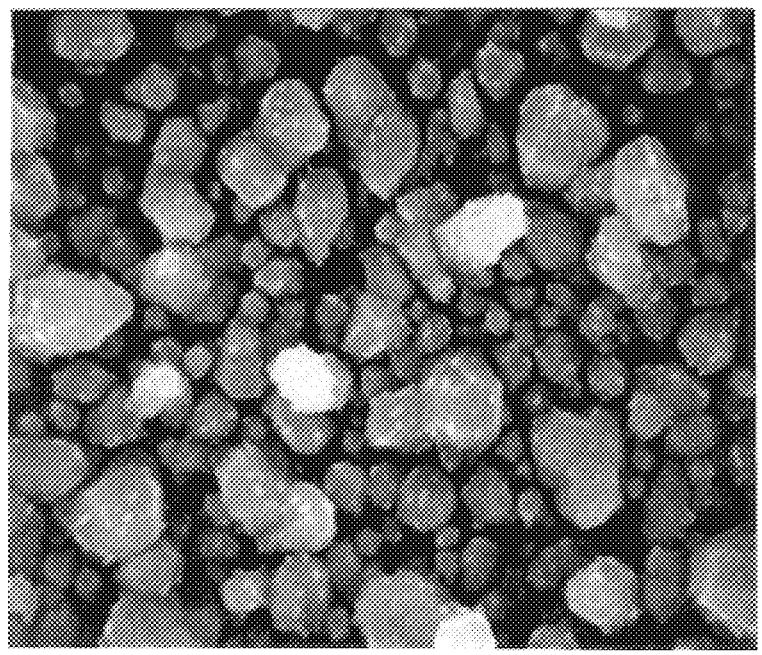
FIG. 7 is a SEM photograph of a 55 nm thick Zn film sputtered onto a glass substrate.
Figure 8:
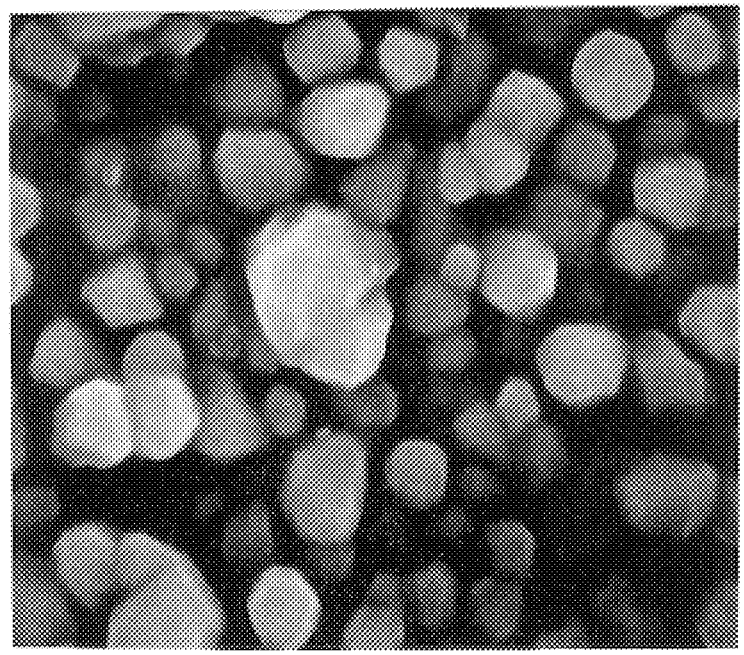
FIG. 8 is a SEM photograph of a 220 nm thick Cu film sputtered onto a glass substrate.
Figure 9:
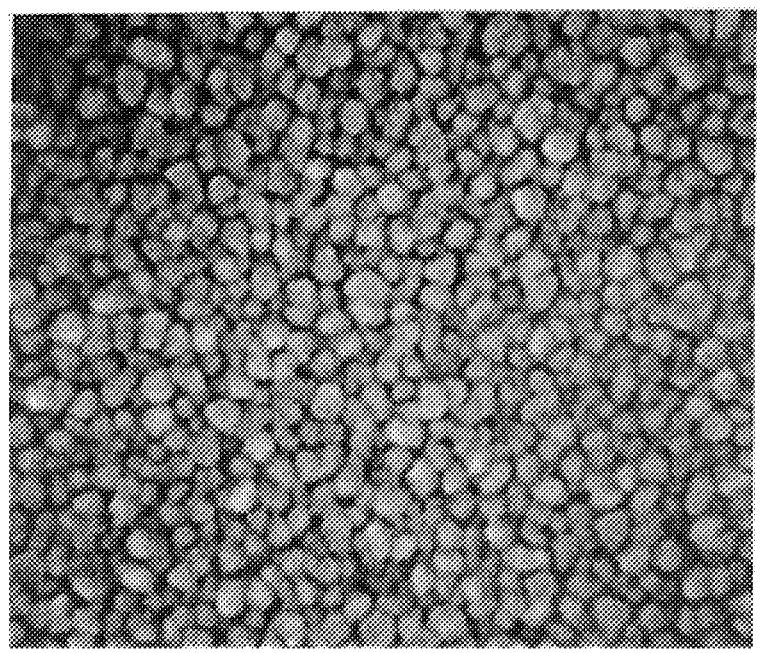
FIG. 9 is a SEM photograph of a 12 nm thick 90% Cu/10% Zn alloy film sputtered onto a glass substrate.
Figure 10:
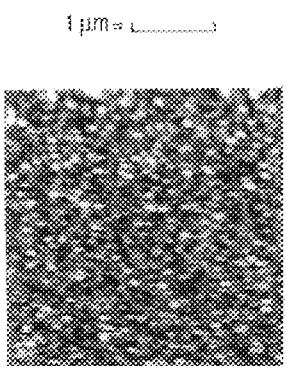
FIG. 10 is an atomic force microscope ("AFM") micrograph of a 3 µm ×3 µm section of the top surface of a disk comprising a smooth glass substrate having a 21 nm thick Al texture film sputtered thereon, and covered by sputtered NiP, a magnetic Co—Ni—Cr—Pt alloy and a carbon protective overcoat.
Figure 11:
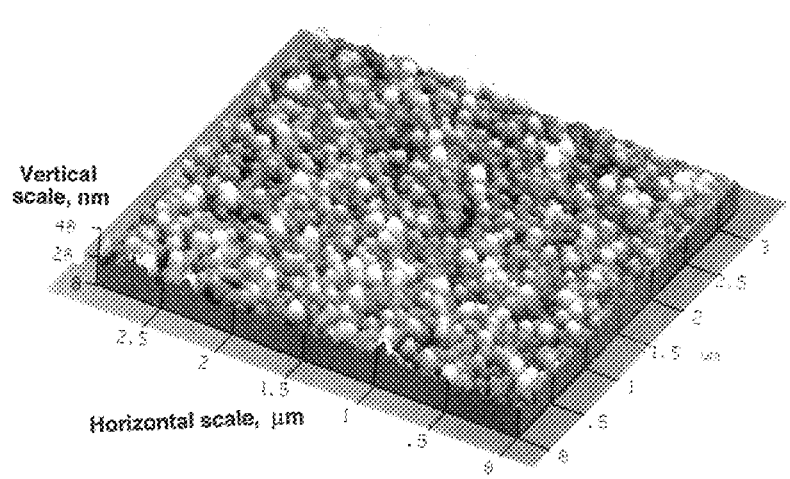
FIG. 11 is a perspective AFM micrograph of the structure of FIG. 10.
Figure 12:
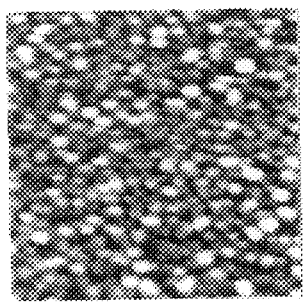
FIG. 12 is an AFM micrograph of the top surface of a disk comprising a smooth glass substrate having a 45 nm thick Al texture film sputtered thereon, and covered by sputtered NiP, a magnetic Co—Ni—Cr—Pt alloy and a carbon protective overcoat.
Figure 13:
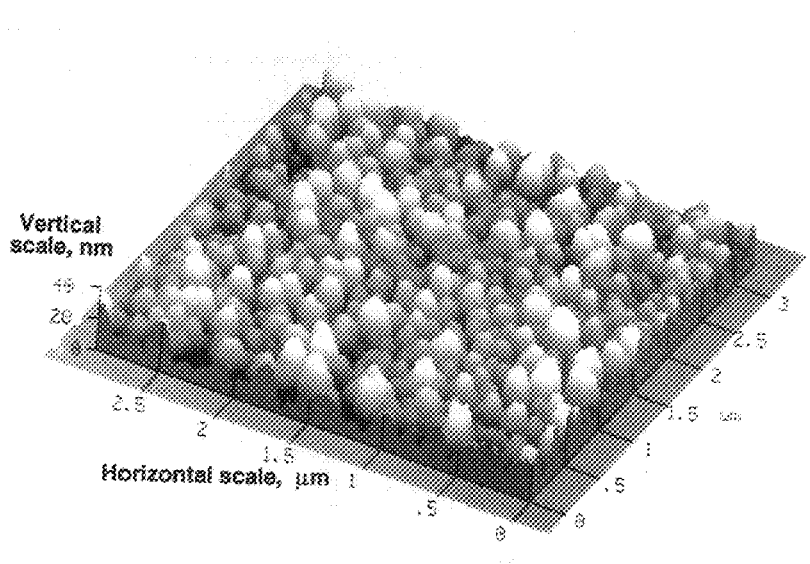
FIG. 13 is a perspective AFM micrograph of the structure of FIG. 12.
Figure 14:
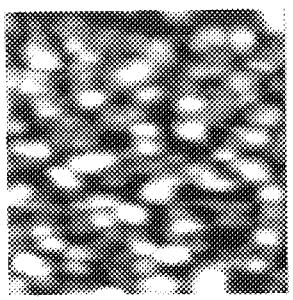
FIG. 14 is an AFM micrograph of the top surface of a disk comprising a smooth glass substrate having an 110 nm thick Al texture film sputtered thereon, and covered by sputtered NiP, a magnetic Co—Ni—Cr—Pt alloy, and a carbon protective overcoat.

FIG. 5 shows the roughness of a disk with a 25 nm thick Cr adhesion layer and a texture film having a thickness of 40 nm graphed against the melting point of the material used to form the texture film. Sn, Zn, Al, Ag, a 90% Cu-10% Zn alloy, and Cu were used to form the texture films in FIG. 5. As can be seen, roughness correlates closely to melting point. The texture films in FIG. 5 were all sputtered at 20 mTorr of argon and a power density of 1.5 W/cm$^2$ by r.f. sputtering.

As mentioned above, texture film roughness increases with thickness. The exact relationship between roughness and thickness depends on the film material. This relationship can be determined empirically for any given material, but the relationship is believed to be of the following form:

$$\text{roughness} = A \times t \times e^{-BT_m/T}$$

where A = a constant;

t = film thickness;

T$_m$ = film material melting point;

B = another constant; and

T = substrate temperature.

FIGS. 6 to 9 are SEM micrographs at a 100K magnification showing respectively the growth in 2 minutes, 30 seconds, 4 minutes and 2 minutes a 45 nm thick of Al layer, a 55 nm thick Zn layer, a 220 nm thick Cu layer and a 120 nm thick 90% Cu-10% Zn layer. Each were sputtered using the above identified Perkin Elmer sputtering apparatus at a pressure of 20 mTorr of Ar using a power density of 0.5 W/cm² with an 8 "(20.3 cm) target on a 95 mm thick glass substrate. These figures show that the roughness of the asperities (crystals) which provide the rough surface texture grow at different rates. For example, thin Al is rougher and has a larger grain size than thicker CuZn sputtered under comparable conditions. However, for all the materials in FIGS. 6 to 9, grain size and roughness increase with film thickness.

Figure 15:
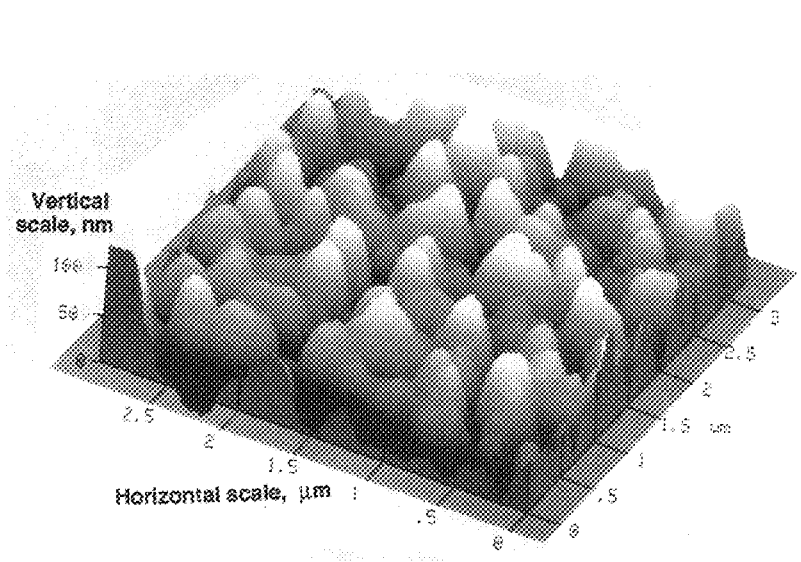
FIG. 15 is a perspective AFM micrograph of the structure of FIG. 14.

FIGS. 10 to 15 show AFM micrographs in plan and perspective views of magnetic disks comprising a smooth (Ra=about 1 nm) glass substrate with respective Al texture films of 21 nm, 45 nm and 110 nm thickness. The disks included sputtered NiP, Co—Ni—Cr—Pt and carbon layers formed thereon. The height and pitch of the asperities are shown in the respective perspective micrographs. It is noted that Al growths of over about 60 nm are shown in FIG. 15 (Al thickness =110 nm), whereas growths of 30 nm can be seen in FIG. 13 (Al thickness =45 nm), and growths of 20 nm can be seen in FIG. 11 (Al thickness =21 nm). Thus, the thicker the texture film, the larger the growths that are formed, and the rougher the disk texture.

Figure 16:
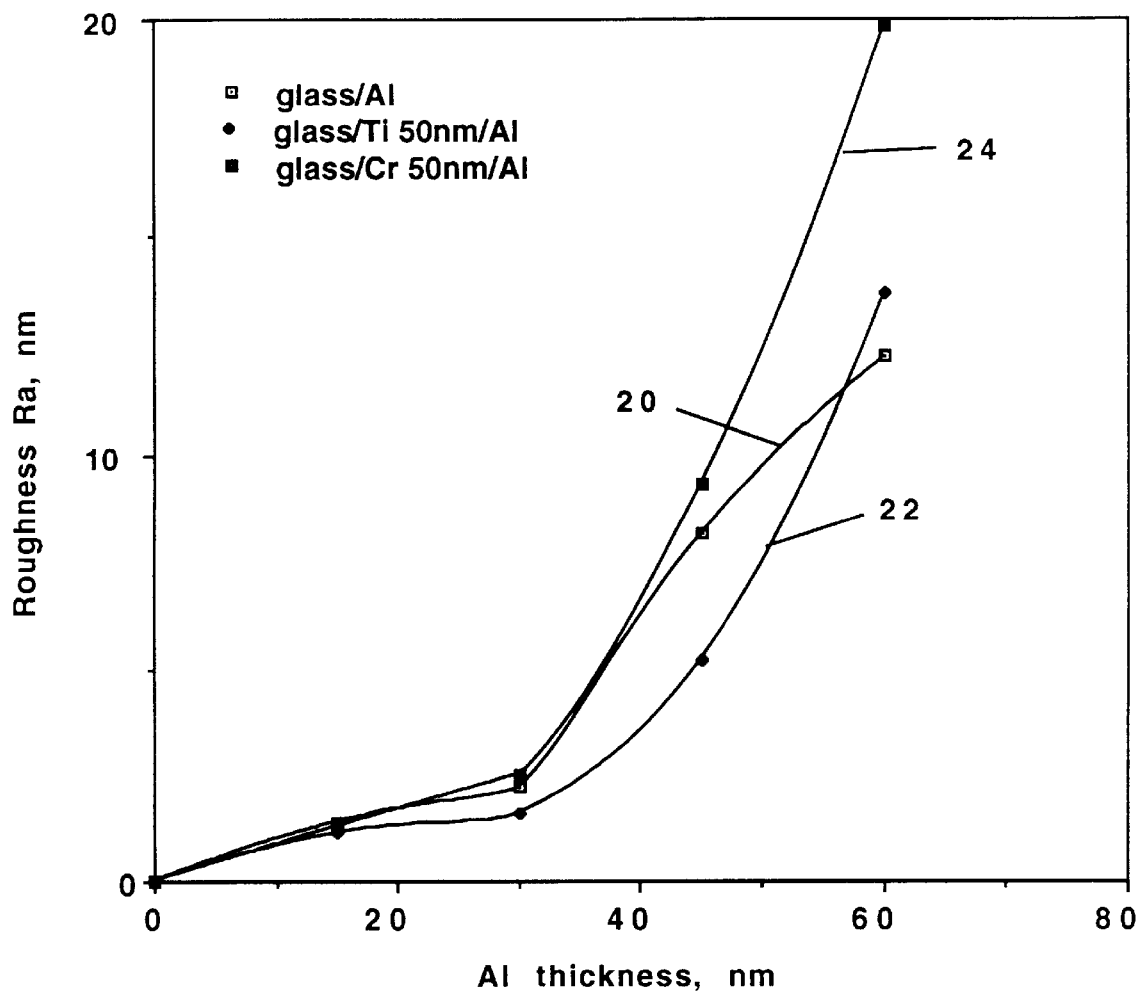
FIG. 16 shows the relationship between the thickness of an Al texture film and the film roughness for Al sputtered onto a glass substrate, Al sputtered onto a 25 nm thick Ti layer formed on a glass substrate and Al sputtered onto a 25 nm thick Cr layer formed on a glass substrate.

FIG. 16 illustrates roughness versus thickness for an Al film formed directly on a smooth glass substrate (curve 20), Al formed on a 25 nm thick Ti adhesion layer which in turn is formed on a glass substrate (curve 22), and Al formed on a 25 nm thick Cr adhesion layer formed on a glass substrate (curve 24). For all three curves, roughness increases with thickness of the Al film. The Ti and Cr adhesion layer have an effect on the Al film roughness, but this effect is not very great.

Figure 17:
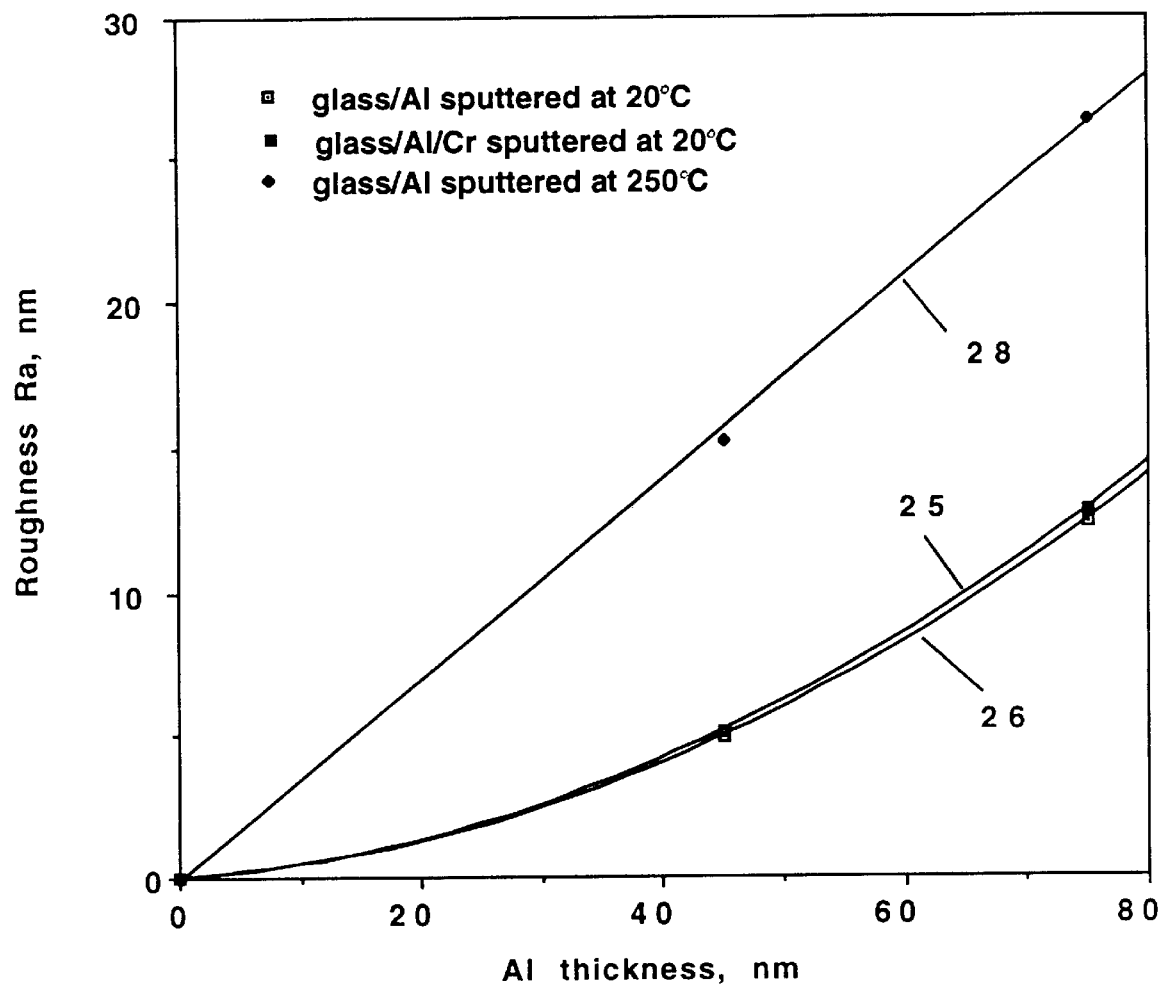
FIG. 17 shows the relationship of the thickness of Al texture films and resultant roughness Ra of disks comprising the Al texture films sputtered at 20° C. and 250° C. onto smooth glass, and for a disk comprising an Al texture film sputtered at 20° C. and covered by a Cr capping layer.

FIG. 17 illustrates the relation between the roughness of disks including sputtered Al texture films and the Al texture film thickness for films sputtered at room temperature (20° C.) and 250° C. (curves 25 and 28, respectively). In order to ensure Ra values of from about 2 to 5 nm with a film thickness less than 60 nm, the substrate should preferably be in a temperature range of 20° C. to 200° C.

Satisfactory Ra values can be achieved with an Al film thickness in the range from about 20 to 60 nm. The bottom curve 26 (see the superimposed indicia in FIG. 17) shows that an added Cr capping layer (layer 15 in FIG. 1) of 25 nm does not affect resultant roughness. Upper curve 28 shows that roughness increases much more rapidly as a function of thickness at high substrate temperatures. As can be seen, there are a set of sputter conditions by which one may form an Al texture film having an Ra of 5 nm. One way to form such an Al film is to sputter using a substrate temperature of 20° C. to a thickness of 45 nm. Another way is to sputter a 15 nm thick Al film using a substrate temperature of 250° C. As mentioned above, the drawback of using higher substrate temperatures includes possible warping of Al/NiP substrates above 250° C., but this is not a problem for other typical substrate materials. However, one of ordinary skill in the art will be able, in light of this disclosure, to select the temperature and thickness combination that is most convenient.

When using more refractory metals (e.g. Cu or Ag), the operating points shift (e.g. one needs a higher substrate temperature and/or greater thickness to achieve a Ra of 5 nm), but the same principles apply (e.g. a higher temperature yields a steeper roughness vs. thickness curve).

Figure 18:
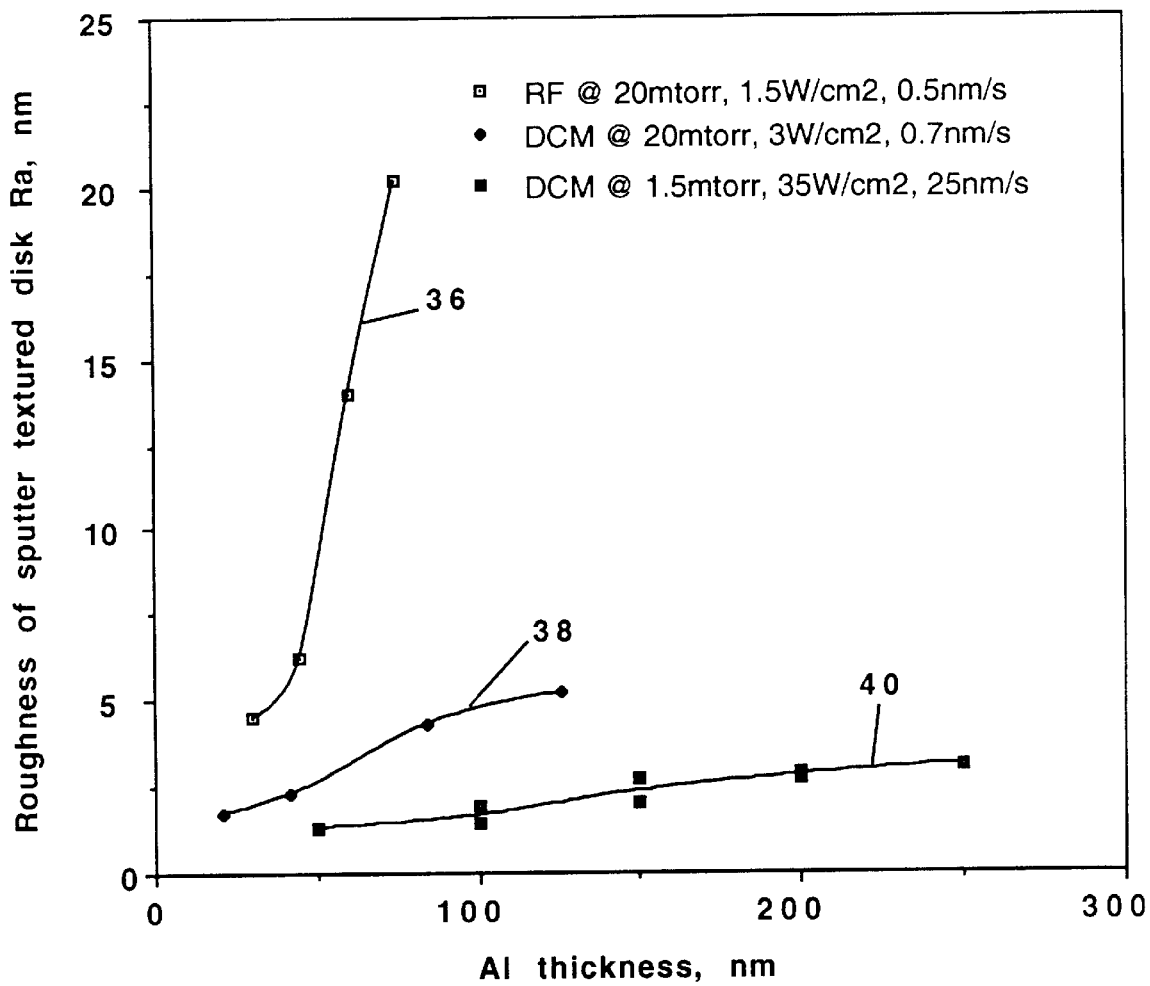
FIG. 18 shows the relationship between roughness and thickness for Al sputtered directly onto a smooth glass substrate by r.f. and d.c. magnetron sputtering.

FIG. 18 shows the relation between roughness and thickness for Al sputtered directly on a smooth glass substrate by r.f. and d.c. magnetron sputtering. As can be seen, r.f. magnetron-sputtering produces a much rougher film (curve 36) than d.c. magnetron sputtering (curve 38) for a given film thickness and the same sputter system. Curve 40 shows the relationship between roughness and thickness for films d.c. magnetron-sputtered in a different sputter system (model SCD-12Z11, manufactured by Ulvac Corp. of Japan), at lower pressure and higher power. Table I lists the conditions under which the films of curves 36, 38, and 40 were formed.

TABLE I

| Curve | Sputtering Type | Pressure | Power Density | Sputtering Rate |
| --- | --- | --- | --- | --- |
| 36 | r.f. magnetron | 20 mTorr | 1.5 W/cm² | 0.5 nm/sec. |
| 38 | d.c. magnetron | 20 mTorr | 3 W/cm² | 0.7 nm/sec. |
| 40 | d.c. magnetron | 1.5 mTorr | 35 W/cm² | 25 nm/sec. |

Figure 26:
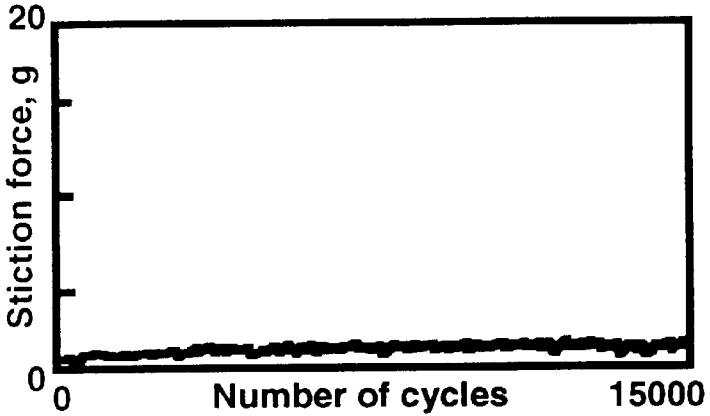
Figure 27:
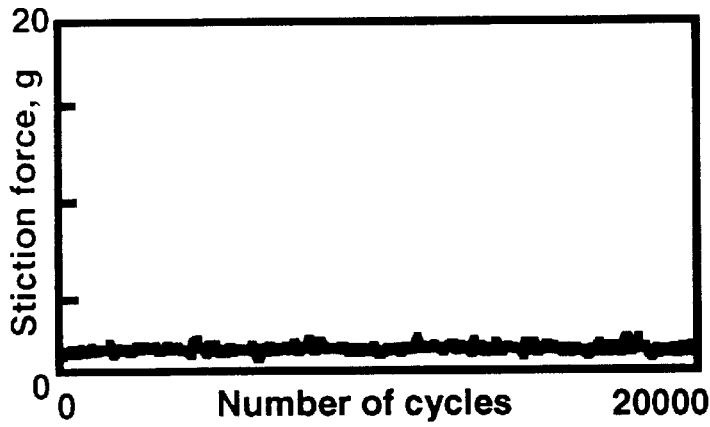

Curves 36, 38, and 40 were generated using room temperature substrates. Since the roughness achieved under the conditions of curve 40 is less than that of curves 36 and 38, it may be necessary to form a thick film and/or use a higher substrate temperature to achieve a particular desired roughness. However, as seen in FIG. 26 (discussed below), a desired roughness can be achieved using the curve 40 system at the indicated pressure and power density.

The invention can be used in an in-line sputter system using r.f. sputtering with pressures of about 10 to 30 mTorr and relatively low power densities (about 1 to 6 W/cm²), similar to the apparatus described in the '259 European patent application, in which the adhesion layer 12, texture film 14, capping layer 15 and the magnetic stack are deposited in one pass. Texture film 14 can also be deposited economically in a separate high throughput machine (e.g. about 500 disks/hour) such as the Ulvac system described above. Other sputtering systems are also suitable for use in my invention.

Figure 19:
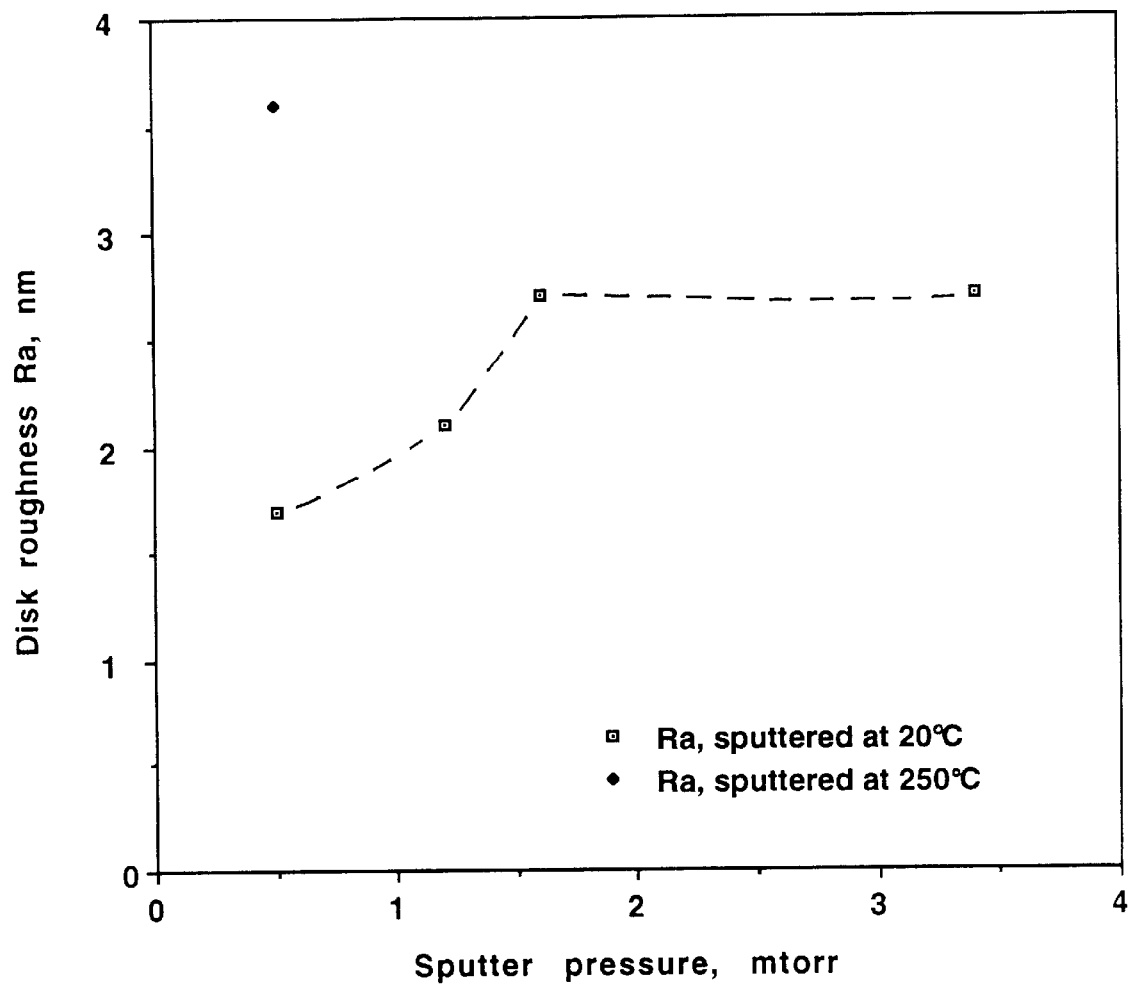
FIG. 19 shows the relationship between roughness and sputtering pressure for a 200 nm thick Al film d.c. magnetron sputtered at a power density of 50 W/cm$^2$.

FIG. 19 shows the relationship between roughness and pressure for a 200 nm thick Al film d.c. magnetronsputtered at a relatively high power (50 W/cm²) and low pressure to achieve high throughput. As can be seen, roughness increases as pressure increases. Roughness also increases with temperature. In the type of system used to generate FIG. 19 (the same system as used to generate curve 40), the texture film must be made thick and/or sputtered using an elevated substrate temperature to get a desired roughness.

In experiments, island formation as described in the '747 patent application, for example, was observed at elevated substrate temperatures (250° C. and over) with very thin films (e.g. about 10 nm). The present invention achieves demonstrably satisfactory textures at lower substrate temperatures (e.g. 20° C. and above) with films less than about 60 nm thick, depending on metal material selection of film 14 (FIG. 1) and sputter conditions.

Figure 20:
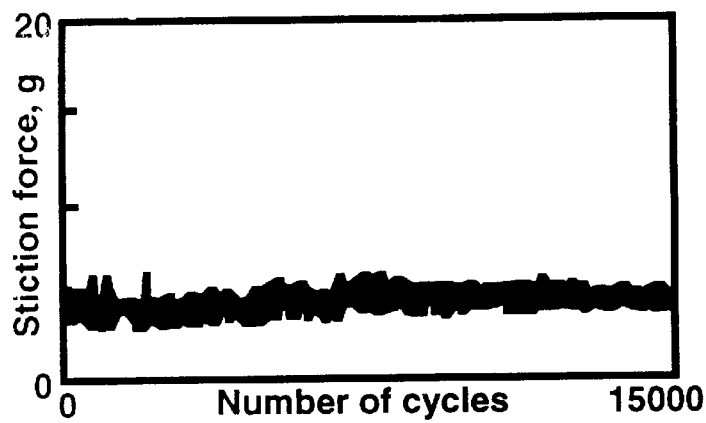
FIGS. 20 to 22 and 24 to 27 illustrate the results of contact-start-stop ("CSS") tests for disks including Al texture films of various thicknesses.
Figure 21:
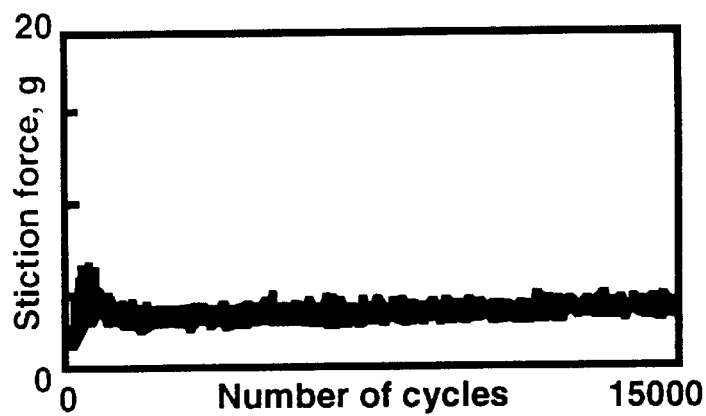
Figure 22:
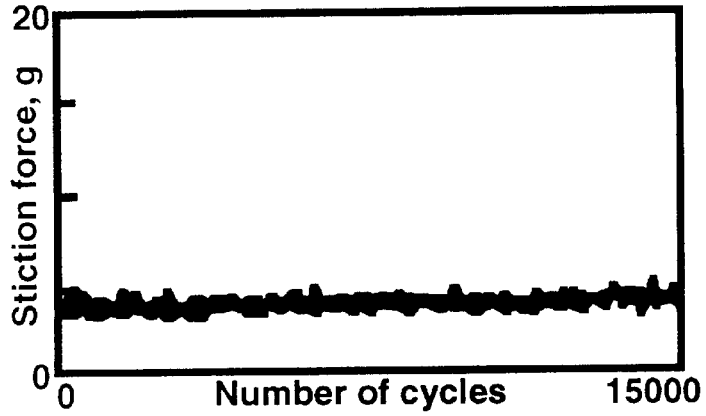
Figure 23:
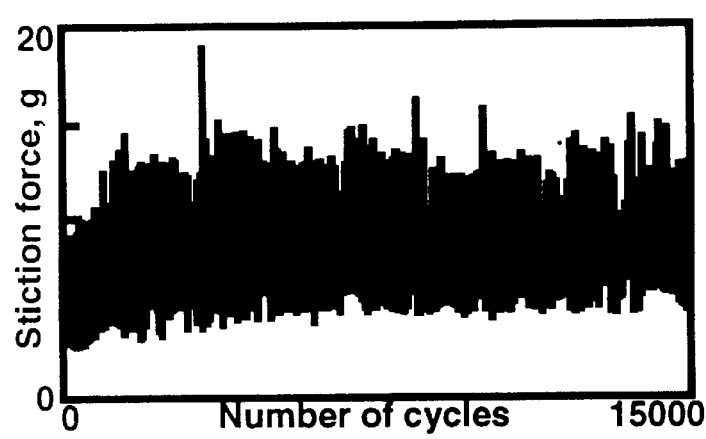
Figure 24:
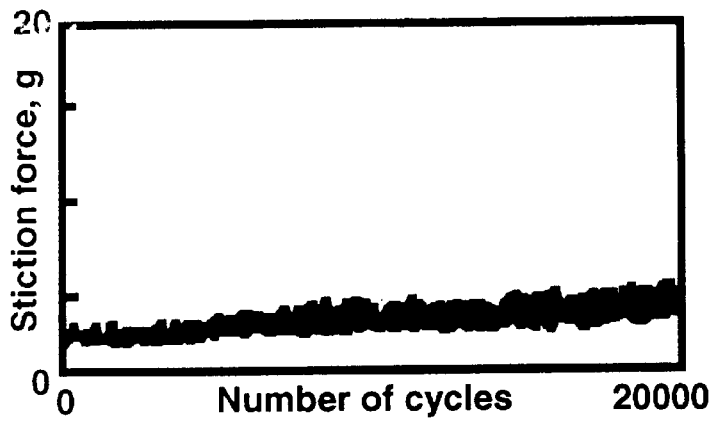
Figure 25:
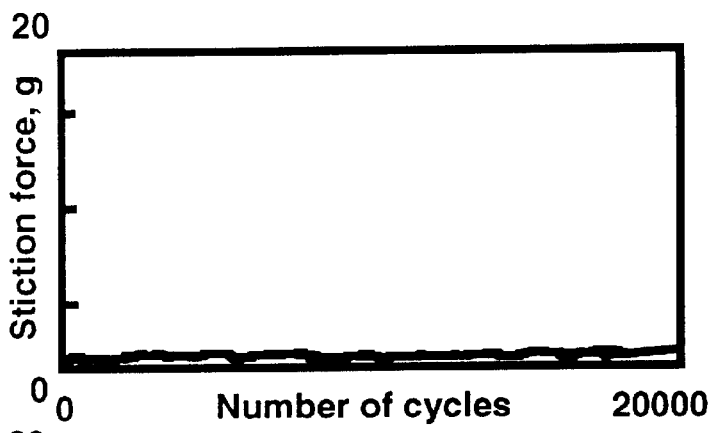

FIGS. 20, 21 and 22 indicate the result of CSS (stiction) testing of complete disks textured in accordance with my invention showing better performance than a conventional circumferentially textured disk of the prior art (FIG. 23). The prior art disk had an Ra of about 7 nm.

The CSS tests in FIGS. 20 to 23 were accomplished using a 70% recording head while a 7 gram force was applied to the head against the disk. (The term "70%" in this context is a well-known term in the industry, and refers to the head size. A 70% head is 2.3×3.3 mm.) During the FIG. 20 to 23 tests, the disk was rotated to 3600 rpm and then stopped 15000 times. The stiction force between the head and disk was measured.

Table II below describes the disks used in FIGS. 20 to 27.

TABLE II

| Figure | Disk Structure |
|---|---|
| FIG. 20 | glass/60 nm thick Al/NiP/CoCrNiPt alloy/carbon/lubricant |
| 21 | glass/25 nm thick Ti/60 nm thick Al/NiP/CoCrNiPt alloy/carbon/lubricant |
| 22 | Al with polished plated NiP/25 nm thick Cr/25 nm thick Zn/NiP/CoCrNiPt alloy/carbon/lubricant |
| 23 | Circumferentially textured NiP-plated Al substrate/NiP/CoCrNiPt alloy/carbon/lubricant |
| 24 | glass/45 nm thick Al/NiP/CoCrNiPt alloy/carbon/lubricant |
| 25 | glass/60 nm thick Al/NiP/CoCrNiPt alloy carbon/lubricant |
| 26 | glass/200 nm thick Al (d.c. magnetron sputtered)/NiP/CoCrNiPt alloy/carbon/lubricant |
| 27 | Circumferentially textured NiP-plated Al/NiP/CoCrNiPt alloy/carbon/lubricant |

All layers in Table I were r.f. sputtered unless otherwise indicated.

In FIG. 23, in a prior art disk, stiction rose to 13 to 14 grams, whereas for the disks of FIGS. 20 to 22, stiction was below about 5 grams. As mentioned above, reduced stiction is highly desirable in magnetic disks.

The tests in FIGS. 24 to 27 were done under the same conditions as those of FIGS. 20 to 23, except using a 3 gram loading force and a 50% slider. (Again, the term "50% slider" refers to a slider having the following dimensions: 1.7×2.4 mm). The test of FIGS. 24 to 27 were much less rigorous than those of FIGS. 20 to 23. It is seen that in each case, stiction was below 4 grams. The disk of FIG. 26 (Al thickness equal 200 nm) exhibited behavior superior to the prior art disk of FIG. 27. The disks of FIGS. 25 and 27 exhibited comparable performance. This comparable performance was achieved without the extra abrasion steps needed to build the disk of FIG. 27.

It should be noted that FIG. 22 shows that the method of the present invention works on substrates comprising an aluminum alloy coated with NiP as well as glass substrates.

Of importance, the texturing technique of the present invention does not negatively impact the magnetic characteristics of the subsequently deposited magnetic film. Table III below compares coercivity for disks constructed in accordance with my invention and disks textured with prior art circumferential textures formed by abrasion. As can be seen, there is no significant difference in coercivity.

TABLE III

| Texture | Coercivity side A | Coercivity side B |
|---|---|---|
| glass/Al(20 mTorr, 1.5 W/cm², 30 nm)/NiP/CoNiCrPt/C | 1712 | 1707 |
| glass/Al(20 mTorr, 1.5 W/cm², 45 nm)/NiP/CoNiCrPt/C | 1722 | 1712 |
| glass/Al(20 mTorr, 1.5 W/cm², 60 nm)/NiP/CoNiCrPt/C | 1783 | 1727 |
| glass/Al(20 mTorr, 1.5 W/cm², 75 nm)/NiP/CoNiCrPt/C | 1793 | 1792 |
| NiP-plated aluminum disk, conventional circumferential texture/NiP/CoNiCrPt/C | 1752 | 1748 |
| NiP-plated aluminum disk, conventional circumferential texture/NiP/CoNiCrPt/C | 1770 | 1755 |
| glass/Al(20 mTorr, 1.5 W/cm², 30 nm)/NiP/CoNiCrPt/C | 1723 | 1709 |
| glass/Al(20 mTorr, 1.5 W/cm², 45 nm)/NiP/CoNiCrPt/C | 1737 | 1723 |
| glass/Al(20 mTorr, 1.5 W/cm², 60 nm)/NiP/CoNiCrPt/C | 1711 | 1711 |
| glass/Al(20 mTorr, 1.5 W/cm², 75 nm)/NiP/CoNiCrPt/C | 1705 | 1709 |
| NiP-plated aluminum disk, conventional circumferential texture/NiP/CoNiCrPt/C | 1767 | 1749 |
| NiP-plated aluminum disk, conventional circumferential texture/NiP/CoNiCrPt/C | 1755 | 1748 |
| glass/Al(20 mTorr, 1.5 W/cm², 30 nm)/NiP/CoNiCrPt/C | 1702 | 1642 |
| glass/Al(20 mTorr, 1.5 W/cm², 45 nm)/NiP/CoNiCrPt/C | 1709 | 1712 |
| glass/Al(20 mTorr, 1.5 W/cm², 60 nm)/NiP/CoNiCrPt/C | 1740 | 1741 |
| glass/Al(20 mTorr, 1.5 W/cm², 75 nm)/NiP/CoNiCrPt/C | 1778 | 1758 |
| NiP-plated aluminum disk, conventional circumferential texture/NiP/CoNiCrPt/C | 1757 | 1747 |
| NiP-plated aluminum disk, conventional circumferential texture/NiP/CoNiCrPt/C | 1764 | 1747 |

Figure 28:
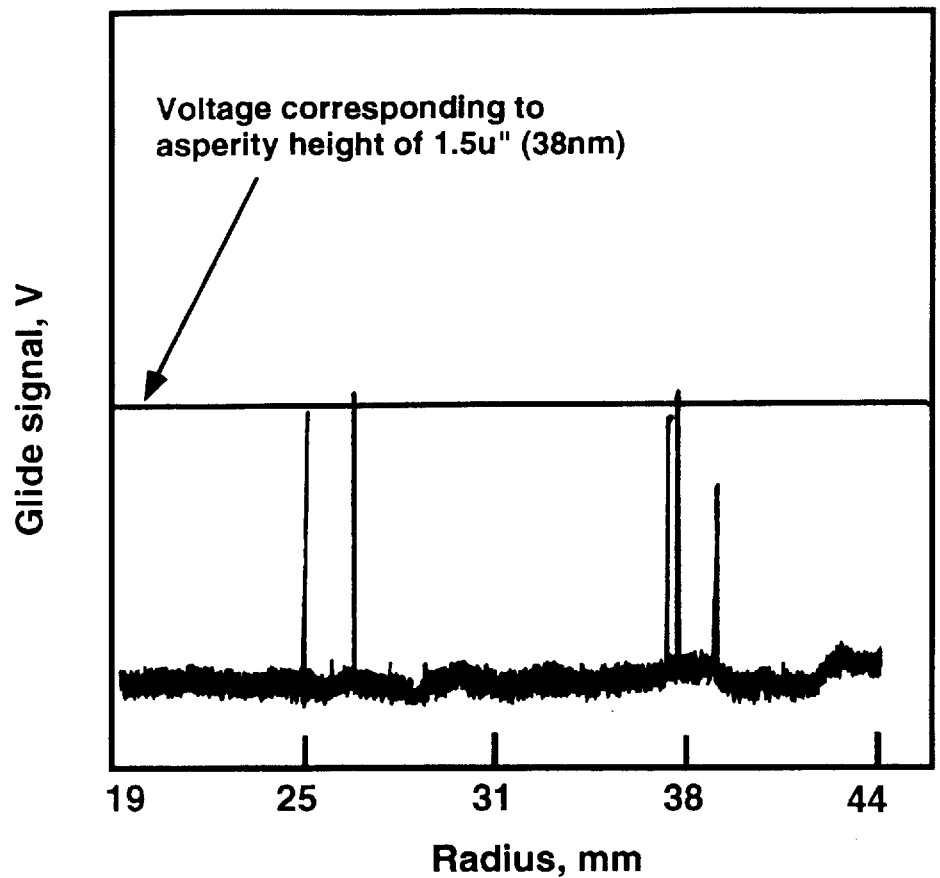
FIG. 28 is a graph of a glide signal vs. disk radius in inches for a disk comprising a polished substrate covered with plated NiP, covered by sputtered 25 nm thick Cr, 66 nm thick Al, a NiP underlayer, a Co—Ni—Cr—Pt magnetic alloy and carbon.

FIG. 28 shows that the sputter textured disk of the invention can support a 1.5$\mu$" (38 nm) glide height. The glide height is a measure of disk roughness.

During the test used to generate FIG. 28, a readwrite head flies at a fixed low height over the magnetic disk. When the head strikes an asperity, a piezo-electric transducer affixed to the head suspension generates a voltage proportional to the strength of the interaction between the head and disk. In most cases, the voltage is roughly proportional to the height of the asperity.

FIG. 28 shows the maximum piezo-electric transducer contact voltage for each disk track vs. radius (distance between the center of the disk and the track). In other words, FIG. 28 provides a measure of the highest asperity on each track. If the output voltage exceeds that corresponding to a test criterion (e.g. a 2$\mu$"(51 nm) asperity), the disk is considered a glide test reject. The disk used to generate FIG. 28 included a polished substrate comprising an aluminum alloy disk coated with NiP, a 25 nm Cr adhesion layer, a 66 nm Al texture film, an NiP underlayer, a CoNiCrPt magnetic alloy and a carbon overcoat. (All layers deposited on the aluminum alloy disk except the first NiP coating were sputtered.)

The few voltage spikes appearing in FIG. 28 were probably due to contamination or dust particles. Upon retesting, the voltage spikes showed up in different locations. A horizontal line in FIG. 28 corresponds to the voltage a 1.5 $\mu$" high asperity would produce. As can be seen, other than the few voltage spikes which are believed to be caused by sources other than asperities, the disk of FIG. 28 passes a 1.5 $\mu$" glide height test with ease.

Figure 29:
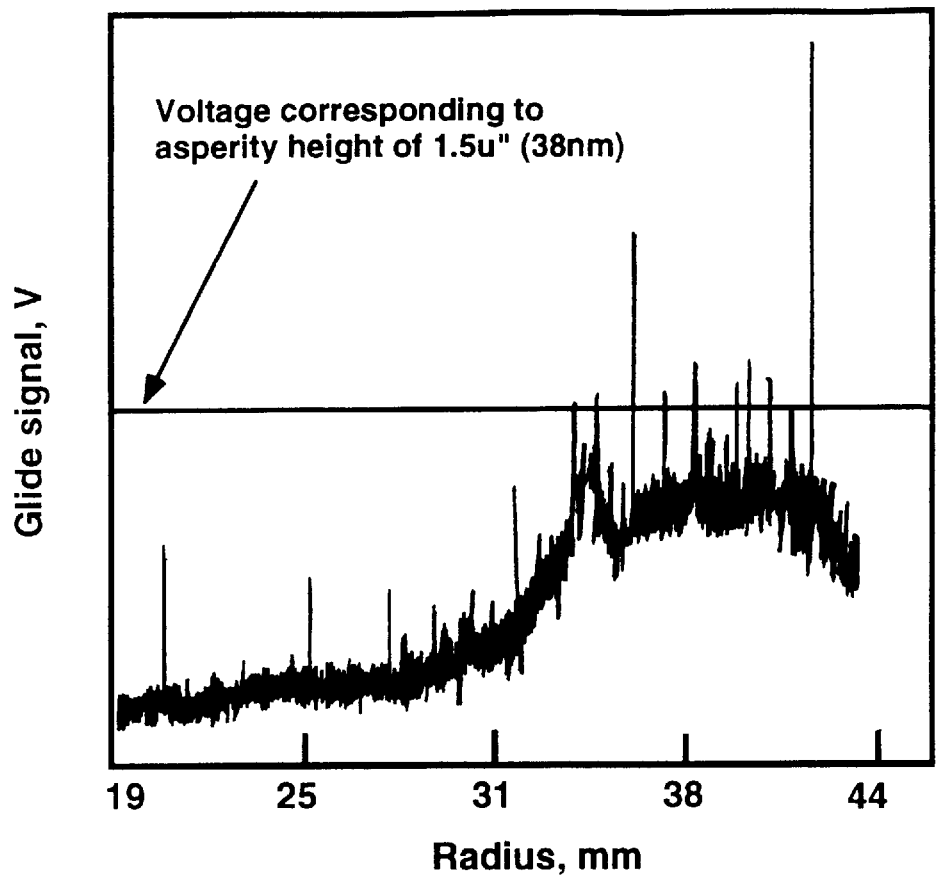
FIG. 29 is a graph of a glide signal vs. disk radius for a conventional circumferentially textured disk.

FIG. 29 shows the result of a glide test on a conventional disk. As can be seen, the glide signal of FIG. 29 indicates that there were many asperities on the conventional disk compared to the disk of FIG. 28.

The above description of embodiments of this invention are illustrative and not limiting. Other embodiments of this invention will be obvious to those skilled in the art in view of the above disclosure. For example, although it is preferred to use the method of the present invention to achieve Ra values of 2 to 5 nm, other Ra values can also be achieved. For example, in one embodiment, Ra values as high as about 10 nm are achieved. Also, although it is desirable to employ thicknesses of 60 nm or less for the texture film, greater thicknesses (100 nm or more) can also be employed.

The present invention is typically practiced using an initially smooth substrate, e.g. having an Ra between about 0.2 and 2 nm. However, initial substrate roughnesses less than 0.2 nm can also be used.

Disks in accordance with my invention can be produced using vacuum deposition techniques other than sputtering, e.g. chemical vapor deposition or evaporation. The same general principles, such as the relation between material melting point, thickness and roughness as described above apply to other vacuum deposition techniques.

I claim:

1. A method for forming a magnetic disk comprising the steps of:

depositing an adhesion layer on a substrate;

depositing onto said adhesion layer a continuous texture film having a texture roughness Ra greater than about 2 nm, wherein said texture roughness is formed during said step of depositing; and depositing a magnetic layer onto said texture film.

2. Method of claim 1 wherein said step of depositing comprises sputtering said texture film.

3. Method of claim 1 wherein said texture film has a roughness Ra less than about 10 nm.

4. Method of claim 1 further comprising the step of: forming a capping layer between said texture film and said magnetic layer.

5. Method of claim 1 further comprising the step of forming an underlayer directly underneath said magnetic layer.

6. Method of claim 1 wherein said texture film is less than about 100 nm thick.

7. Method of claim 1 wherein said texture film has a thickness between about 20 and 60 nm.

8. Method of claim 1 wherein said texture film is a metal having a melting point less than about 1000° C.

9. A method of fabricating a magnetic data storage disk on a smooth non-magnetic substrate comprising:

forming an adhesion layer on said substrate;

causing said substrate and adhesion layer to be at a temperature in a range of about 20° C. to about 200 ° C.;

r.f. sputtering a texture film material on the adhesion layer at a sputter pressure in a range of about 10 to about 30 MTorr to form a roughened layer having a surface roughness Ra of from about 2 to about 5 nm in the form of a continuous layer over the entire substrate and having a thickness of from about 20 to about 60 nm, whereby said roughened layer does not include pores or gaps, said texture material having a melting point less than about 1000° C.; and sputtering a magnetic stack comprising an underlayer, magnetic layer and overcoat layer on top of the roughend layer.

10. The method of claim 9 including the step of sputtering said adhesion layer on said substrate prior to the step of sputtering said texture film.

11. The method of claim 10 wherein said adhesion layer is a material comprising one or more metals selected from the group consisting of Cr, Ta, Ti, W, V, Sc, Mo, Nb and Zr.

12. The method of claim 9 including the step of sputtering a capping layer over the texture film.

13. The method of claim 12 wherein said capping layer is a material comprising one or more metals selected from the group consisting of Cr, Ti, Ta, W, V, Mo, and Nb.

14. The method of claim 9 wherein said texture film comprises one or more materials selected from the group consisting of Al, Zn, Cu, Ag, Sn, Pb and Au.

15. The method of claim 9, wherein said substrate is a metallic substrate, a glass substrate, a glass-ceramic substrate, a ceramic substrate or a sintered carbon substrate.

16. The method of claim 9 wherein said substrate is a polished glass substrate.

17. The method of claim 9 wherein said sputtering steps are performed in an in-line r.f. sputtering apparatus.

18. A method of fabricating a magnetic data storage disk on a smooth non-magnetic substrate comprising the steps of:

providing an adhesion layer on a substrate;

sputtering a texture film material by d.c. magnetron or r.f. magnetron sputtering on the adhesion layer while the substrate and adhesion layer are at a temperature between about 20° to about 200° C., at a pressure in the range of about 1 to 10 mTorr, to form a roughened layer having a surface roughness Ra of from about 2 to 5 nm in the form of a continuous layer over the entire substrate and having a thickness between about 20 to 100 nm, whereby said roughened layer does not include pores or gaps, said texture film material having a melting point less than or equal to about 1000° C.; and sputtering a magnetic stack comprising an underlayer, magnetic layer and overcoat on top of the roughened layer.

19. Method of claim 1 wherein said substrate is a metallic substrate or a sintered carbon substrate.

20. Method of claim 1 wherein said adhesion layer is a material comprising one or more metals selected from the group consisting of Cr, Ta, Ti, W, V, Mo, Nb, Sc, Y and Zr.

21. A method for forming a magnetic disk comprising the steps of:

depositing onto a substrate a continuous texture film lacking pores and gaps and having a texture roughness Ra greater than about 2 nm, wherein said texture roughness is formed during said step of depositing;

depositing a capping layer on said texture film, said capping layer being formed from a material that is harder than said texture film;

depositing an underlayer on said capping layer; and depositing a magnetic layer onto said underlayer.

22. Method of claim 21 wherein said underlayer comprises NiP, Cr or a Cr alloy.

23. Method of claim 21 further comprising the step of forming an adhesion layer between said substrate and said texture layer.

24. Method of claim 21 wherein said substrate is a sintered carbon substrate; or a metallic substrate.

25. Method of claim 21 wherein said underlayer serves as a nucleation layer for said magnetic layer.

26. Method of claim 21 wherein said capping layer is a cermic material.

27. Method of claim 21 wherein said capping layer comprises a metal selected from the group of materials consisting of Cr, Ta, Ti, W, Mo, Nb, Zr and V.

28. A method for manufacturing a magnetic disk comprising the steps of:

depositing an adhesion layer onto a substrate;

depositing onto said adhesion layer a continuous texture film lacking pores and gaps and having a texture roughness Ra greater than about 2 nm, wherein said texture film roughness is formed during said step of depositing, said adhesion layer causing said texture film to adhere more tightly to said substrate than if said adhesion layer were absent, said texture film having a melting point less than about 1000° C.;

depositing a capping layer on said texture film, said capping layer being formed from a material that is harder than said texture film, said capping layer protecting said texture film;

depositing an underlayer on said capping layer, said underlayer being a material different from said capping layer;

depositing a magnetic layer directly onto said underlayer; and depositing a protective overcoat on said magnetic layer.

29. Method of claim 28 wherein a) said substrate is a metallic substrate or a sintered carbon substrate;

b) said adhesion layer is a material selected from the group consisting of Cr, Ta, Ti, W, V, Y, Sc, Mo, Nb and Zr and is 2 to 20 nm thick;

c) said texture film comprises one or more materials selected from the group consisting of Al, Zn, Cu, Ag, Sn, Pb, Bi, In, Li, Se and Au and is 20 to 60 nm thick and has an Ra of 2 to 5 nm;

d) said capping layer comprises one or more materials selected from the group consisting of Cr, Ti, Ta, W, V, Mo and Nb and is 10 to 30 nm thick;

e) said underlayer is a sputtered Ni alloy, Cr or a Cr alloy;

f) said magnetic layer is a Co alloy; and g) said adhesion layer, texture film, capping layer, underlayer and magnetic layer are formed by sputtering.

30. Method of claim 29 wherein:

a) said underlayer is sputtered NiP;

b) said magnetic layer is CoCrNiPt;

c) said substrate comprises an Al alloy coated with NiP;

d) during sputtering of said texture film, said substrate is at 20° to 200° C.; and e) sputtering said texture film is accomplished by r.f. sputtering at a pressure of about 10 to 30 mTorr, and all of the sputtered layers on said disk are sputtered in in-line sputtering apparatus.

31. Method of claim 29 wherein:

a) said underlayer is sputtered NiP, b) said magnetic layer is CoNiCrPt;

c) said substrate comprises an Al alloy coated with NiP;

d) during sputtering, said substrate is at 20° to 200° C.; and e) sputtering said texture film is accomplished by d.c. magnetron or r.f. magnetron sputtering at a pressure of 1 to 10 MTorr.

32. Method of claim 28 wherein the said substrate comprises glass, ceramic or sintered carbon.

33. Method of claim 21 wherein the surface roughness Ra of said disk immediately prior to forming said texture film is less then about 2 nm.

34. Method of claim 28 wherein said substrate comprises an Al alloy coated with NiP.

35. Method of claim 23 wherein said texture film comprises a material having a melting point less than about 1000° C.

36. A method for forming a magnetic disk comprising the steps of:

depositing an adhesion layer onto a substrate;

depositing onto said adhesion layer a continuous texture film having a texture roughness Ra greater than about 2 nm, wherein said texture roughness is formed during said step of depositing;

depositing a capping layer on said texture film, said capping layer being formed from a material that is harder than said texture film;

depositing an underlayer on said capping layer; and depositing a magnetic layer onto said underlayer.

37. Method of claim 36 wherein said texture film comprises a material having a melting temperature less than 1000° C.

38. Method of claim 37 wherein said substrate comprises an Al alloy coated with NiP.

39. Method of claim 28 wherein a) said substrate is glass;

b) said adhesion layer is a material selected from the group consisting of Cr, Ta, Ti, W, V, Y, Sc, Mo, Nb and Zr and is 2 to 20 nm thick;

c) said texture film comprises one or more materials selected from the group consisting of Al, Zn, Cu, Ag, Sn, Pb, Bi, In, Li, Se and Au and is 20 to 60 nm thick and has an Ra of 2 to 5 nm;

d) said capping layer comprises one or more materials selected from the group consisting of Cr, Ti, Ta, W, V, Mo and Nb and is 10 to 30 nm thick;

e) said underlayer is a sputtered Ni alloy, Cr or a Cr alloy;

f) said magnetic layer is a Co alloy; and g) said adhesion layer, texture film, capping layer, underlayer and magnetic layer are formed by sputtering.

* * * * *

UNITED STATES PATENT AND TRADEMARK OFFICE
CERTIFICATE OF CORRECTION

PATENT NO.    : 5,871,621
ISSUE DATE    : February 16, 1999
INVENTOR(S)   : Ross, Caroline A.

It is certified that error appears in the above-identified patent and that said Letters Patent is hereby corrected as shown below:

Claim 1, Column 11, line 13, after "2nm" add --without leaving pores or gaps in said texture film--.

Claim 1, Column 11, line 14, after "depositing" add --said texture film, said texture film comprising a material having a melting point less than about 1000°C--.

Claim 2, Column 11, line 17, delete "comprises sputtering said texture film" and add --said texture film comprises sputtering--.

Claim 9, Column 11, line 40, delete "MTorr" and add --mTorr--.

Claim 31, Column 13, line 45, delete "MTorr" and add --mTorr--.

Signed and Sealed this

Sixth Day of February, 2001

Attest:

Q. TODD DICKINSON

*Attesting Officer*     *Director of Patents and Trademarks*